US 6,730,763 B1

(12) United States Patent
Okazaki et al.

(10) Patent No.: US 6,730,763 B1
(45) Date of Patent: May 4, 2004

(54) COMPOSITION

(75) Inventors: Eiichi Okazaki, Aichi (JP); Michihiro Kaai, Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 0 days.

(21) Appl. No.: 10/239,995

(22) PCT Filed: Mar. 29, 2000

(86) PCT No.: PCT/JP01/01905

§ 371 (c)(1),
(2), (4) Date: Sep. 27, 2002

(87) PCT Pub. No.: WO01/72858

PCT Pub. Date: Oct. 4, 2001

(30) Foreign Application Priority Data

Mar. 29, 2000 (JP) .......................................... 2000-92489

(51) Int. Cl.$^7$ .............................................. C08F 122/40
(52) U.S. Cl. ........................ 526/262; 526/264; 526/320; 526/328.5
(58) Field of Search ................................. 526/262, 264, 526/320, 328.5

(56) References Cited

U.S. PATENT DOCUMENTS

| 5,047,259 A | 9/1991 | Oberkobusch et al. |
| 5,200,462 A | 4/1993 | Sutton et al. |
| 5,559,187 A | * 9/1996 | Maeda et al. .................. 525/73 |
| 5,886,112 A | 3/1999 | Vuillemin et al. |
| 6,255,403 B1 | * 7/2001 | Andrist et al. ........... 525/326.1 |
| 6,329,443 B1 | 12/2001 | Okazaki et al. |
| 6,388,026 B1 | * 5/2002 | Campbell et al. ............. 526/64 |

FOREIGN PATENT DOCUMENTS

| EP | 0496472 B1 | 7/1992 |
| EP | 496 472 A1 | 7/1992 |
| EP | 1 043 313 A1 | 10/2000 |
| JP | 55-160010 | 12/1980 |
| JP | 57-502171 | 12/1982 |
| JP | 59-6207 | 1/1984 |
| JP | 60-215007 | 10/1985 |
| JP | 62-205108 | 9/1987 |
| JP | 11-198552 | 7/1999 |
| WO | WO 98/58912 A1 | 12/1998 |

* cited by examiner

*Primary Examiner*—Helen L. Pezzuto
(74) *Attorney, Agent, or Firm*—Fitch Even Tabin & Flannery

(57) ABSTRACT

A composition which is useful as a material with excellent weatherability, such as paints, printing ink, adhesive, filler, molding material, or resist, and is especially suitable for use in applications such as OPV and coating materials. The composition comprises as an active ingredient a polymer obtained by continuously polymerizing at a high temperature either a polymerizable monomer having a maleimide group and other polymerizable group or a polymerizable monomer having a succinimide group.

9 Claims, No Drawings

COMPOSITION

CROSS-REFERENCED APPLICATIONS

This application is a National phase of International Application PCT/JP01/01905, filed 12 Mar. 2001, which designated the U.S. and that International Application was not published under PCT Article 21(2) in English.

TECHNICAL FIELD

The present invention relates to compositions useful as materials for overprint varnishes (hereinafter called "OPV"), paints, printing inks, adhesives, fillers, molding materials, resists and the like. The compositions of this invention are especially suitable for such applications as OPV and paints.

In this specification, "acrylate and/or methacrylate" is expressed as "(meth)acrylate", "acrylic acid and/or methacrylic acid", as "(meth)acrylic acid", and "acryloyl and/or methacryloyl", as "(meth)acryloyl".

BACKGROUND ART

Materials often used for the above-mentioned applications include acrylic polymers. Acrylic polymers are materials that have relatively good weather resistance, but depending on conditions of use, they are still insufficient in weather resistance, and often limited in use for applications that require high weather resistance.

Acrylic polymers obtained by polymerizing a monomer having a maleimide or succinimide group are known (JP-A-62-205108), and copolymers obtained by polymerizing monomers having a maleimide group which contains two substituents at an ethylenically unsaturated group is also known as acrylic polymers that can be crosslinked with the photo dimerization reaction triggered by irradiation with ultraviolet light (JP-A-55-160010). However, these polymers are also still insufficient in weather resistance, depending on conditions of use, and have the problem that they are often limited in use for the applications that require high weather resistance.

As materials that have often been used for the above-mentioned applications other than the acrylic polymers, ultraviolet-curing compounds can be exemplified. Typical examples of them include acryloyl group-containing compounds (hereinafter called "oligoacrylates") such as trimethylolpropane triacrylate and pentaerythritol tetraacrylate. Since these compounds are usually cured with addition of an ultraviolet polymerization initiator, components derived from the initiator remain in the cured products, and it can happen that the cured products are colored or degraded in weather resistance. So, their use in the applications requiring high weather resistance is restricted.

Ultraviolet light absorbers, light stabilizers, antioxidants, etc. are used in attempts to improve weather resistance, but their effect is still insufficient. Furthermore, ultraviolet-curing compounds also have a problem that they are lowered in ultraviolet curability by the addition of these additives, and cause productivity to be lowered as the case may be.

The present invention provides compositions excellent in weather resistance and useful as materials for paints, printing inks, adhesives, fillers, molding materials, resists and the like, especially compositions suitable for such applications as OPV, paints and the like.

DISCLOSURE OF THE INVENTION

To solve the above problems, the composition of this invention is characterized in that it comprises, as an effective ingredient, a polymer obtained by effecting a continuous polymerization of a polymerizable monomer having a maleimide group and a polymerizable group other than the maleimide group, or a polymerizable monomer having a succinimide group, at high temperature.

Furthermore, in the composition of this invention, it is preferred that the polymer is obtained by effecting the continuous polymerization at a temperature of 150 to 350° C.

Still furthermore, in the composition of this invention, it is preferred that the polymerizable monomer is one which contains a maleimide group bonded to an acryloyl group by way of an oxyalkylene group.

Still furthermore, it is preferred that the composition of this invention also contains a compound having a radical-polymerizable group as an essential ingredient.

This invention also provides an overprint varnish composed of said composition.

Furthermore, this invention provides a paint composed of said composition.

Hereinafter, embodiments of this invention are described in detail.

The composition of this invention comprises,. as an effective ingredient, a polymer obtained by effecting a continuous polymerization of a polymerizable monomer having a maleimide group and a polymerizable group other than the maleimide group (this monomer is hereinafter called "maleimide monomer"), or a polymerizable monomer having a succinimide group (this monomer is hereinafter called "succinimide monomer") at high temperature. (This polymer is hereinafter simply called "polymer" in some cases).

As the maleimide group of the maleimide monomer, those having a structure represented by the following formula (1) can be exemplified.

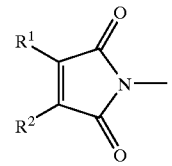

(1)

In the above formula, $R^1$ and $R^2$ each independently denote a hydrogen atom or alkyl group with 1 to 4 carbon atoms, or jointly denote an alkylene group forming a five- or six-membered ring.

The polymerizable group other than the maleimide group of the maleimide monomer can be a radical-polymerizable group such as (meth)acryloyl group, allyl group, methallyl group and vinyl ester group.

The maleimide monomer can be a monomer having a maleimide group and a (meth)acryloyl group, allyl group, methallyl group or vinyl ester group respectively exemplified above. It is preferred that the maleimide monomer has the maleimide group bonded to an acryloyl group by way of an oxyalkylene group, since the monomer has good polymerizability, and since the resultant polymer has good flexibility. It is especially preferred that the maleimide monomer is a monomer represented by the structural formula shown in the following formula (2), since the resultant polymer has the maleimide groups unreacted and are likely to remain curable.

(2)

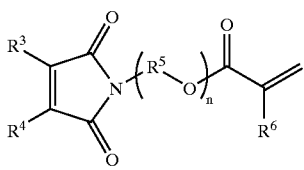

In the above formula, $R^3$ and $R^4$ each independently denote an alkyl group with 1 to 4 carbon atoms, or jointly denote an alkylene group forming a five- or six-membered ring. Furthermore, $R^5$ denotes a straight-chain or branched-chain alkylene group with 1 to 6 carbon atoms; $R^6$ denotes a hydrogen atom or methyl group; and n denotes an integer of 1 to 6.

Especially preferred examples of the maleimide monomer include the compounds represented by the structural formulae shown in the following formulae (3) and (4).

(3)

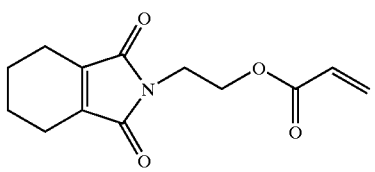

(4)

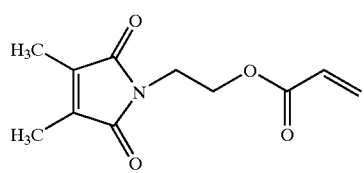

These maleimide monomers can be produced, for example, by the methods described in the following publicly known documents:

Kiyoshi Kato et al, "Journal of Synthetic Organic Chemistry Association", 30 (10), 897, (1972).

Javier de Abajo et al, "Polymer", vol.33 (5), (1992).

JP-A-56-53119

JP-A-1-242569

The succinimide monomer has a succinimide group and a polymerizable group. As the succinimide group of the succinimide monomer, those represented by the structure shown in the following formula (5) can be exemplified.

(5)

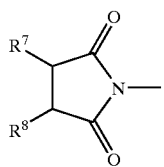

In the above formula, $R^7$ and $R^8$ each independently denote a hydrogen atom or alkyl group with 1 to 4 carbon atoms, or jointly denote an alkylene group forming a five- or six-membered ring.

The polymerizable group of the succinimide monomer can be a radical-polymerizable group such as (meth)acryloyl group, allyl group, methallyl group or vinyl ester group.

The succinimide monomer can be a monomer having a succinimide group and a (meth)acryloyl group, allyl group, methallyl group or vinyl ester group respectively exemplified above.

Especially preferred examples of the succinimide monomer include the compounds represented by the structural formula shown in the following formula (6).

(6)

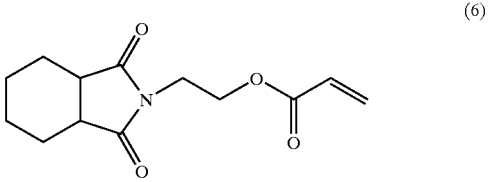

The succinimide monomer can be produced according to the methods described in the publicly known documents listed above, like said maleimide monomer.

The polymer of this invention can be obtained by polymerizing one or more kinds of maleimide monomers or one or more kinds of succinimide monomers, and also may be a copolymer of a maleimide monomer with a succinimide monomer, and furthermore may be those with which another monomer (hereinafter called "comonomer") than the maleimide monomer and the succinimide monomer, which is copolymerizable with these monomers, is copolymerized.

Examples of the comonomer include styrene, (α-methylstyrene, (meth)acrylonitrile, vinyl acetate, and (meth)acrylates other than said maleimide monomers and succinimide monomers.

Examples of the (meth)acrylates other than maleimide monomers and succinimide monomers include methyl (meth)acrylate, ethyl (meth)acrylate, butyl (meth)acrylate, isobutyl (meth)acrylate, 2-ethylhexyl (meth)acrylate, cyclohexyl (meth)acrylate, benzyl (meth)acrylate, 2-methoxyethyl (meth)acrylate, 2-ethoxyethyl (meth)acrylate, isobornyl (meth)acrylate, hydroxyethyl (meth)acrylate, hydroxypropyl (meth)acrylate, (meth)acrylic acid, a dimer or higher oligomer produced with Michael addition of (meth)acrylic acid, and carboxyl group-containing (meth)acrylates such as ω-carboxypolycaprolactone mono(meth)acrylate, phthalic acid monohydroxyethyl (meth)acrylate and succinic acid monohydroxyethyl (meth)acrylate.

As for the polymer, it is preferred that the maleimide monomer unit and the succinimide monomer unit jointly account for 5 to 95 parts by weight, more preferably 10 to 90 parts by weight, based on 100 parts by weight of the constitutional monomer units of the polymer. If both units account for smaller than 5 parts by weight, adhesion and weather resistance may become poor, and if larger than 95 parts by weight, abrasion resistance may be impaired.

Further, the polymer is preferably constituted by 5 to 95 parts by weight, more preferably 10 to 90 parts by weight of the maleimide monomer unit in which a maleimide group is bonded to an acryloyl group through an oxyalkylene group. The reason is that the obtained polymer can have good flexibility.

Furthermore, the polymer is preferably constituted by 5 to 95 parts by weight, particularly preferably 10 to 90 parts by weight of the maleimide monomer unit represented by the structural formula shown in the above formula (2). The reason is that the obtained polymer has the maleimide groups unreacted, and is likely to possess curability.

It is preferred that the polymer of this invention has a number average molecular weight of 1,000 to 15,000, and a more preferred range is 2,000 to 10,000. If the number average molecular weight is less than 1,000, a film formed with the composition may become low in strength, surface hardness, water resistance and solvent resistance. If it is more than 5,000, the composition often becomes high in viscosity, thereby being deteriorated in workability.

Furthermore, in this invention, polydispersity index (Mw/Mn) of the polymer as a ratio of the weight average molecular weight (Mw) to the number average molecular weight (Mn) is preferably 5 or less, and more preferably 3 or less. The reason is that the viscosity of the composition and the balance in the physical properties of the obtained film become improved.

In this invention, the number average molecular weight and the weight average molecular weight mean those which are obtained by calculating by polystyrene standard from the molecular weights measured by gel permeation chromatography (hereinafter referred to as "GPC") using tetrahydrofuran as a solvent.

The polymer of this invention is obtained by effecting continuous polymerization of a maleimide monomer or succinimide monomer at high temperature, preferably effecting continuous radical polymerization at high temperature.

The high temperature continuous polymerization can be carried out according to publicly known methods (JP-A-57-502171, JP-A-59-6207 and JP-A-60-215007).

For example, a pressurizable reactor vessel is filled with a solvent, and is set at a predetermined temperature under pressure. Then, a monomer or a mixture of the monomer with, as required, polymerization solvent or polymerization initiator is fed to the reactor at a constant feed rate, and the reaction solution is taken out by an amount corresponding to the feed rate of the monomer mixture.

When a polymerization solvent is used, the solvent initially fed into the reactor vessel may be the same as or different from the solvent contained in the monomer mixture. These solvents include aliphatic hydrocarbons, aromatic hydrocarbons such as toluene, xylene, cumene and ethylbenzene, glycol ethers such as butyl cellosolve, other cellosolves and carbitol, ethers such as glymes including ethylene glycol dimethyl ether and diglymes including diethylene glycol dimethyl ether, acetic esters such as ethyl acetate, butyl acetate, cellosolve acetate, methylpropylene glycol acetate, carbitol acetate and ethylcarbitol acetate, ketones such as acetone and methyl ethyl ketone, aliphatic alcohols such as isopropyl alcohol, hexanol, decanol, ethylene glycol, propylene glycol and butylene glycol, aromatic alcohols such as benzyl alcohol and toluene alcohol, and polyalkylene glycols such as diethylene glycol, polyethylene glycol, dipropylene glycol, tripropylene glycol, polypropylene glycol, tetramethylene glycol and polytetramethylene glycol. It is preferred that an amount of the polymerization solvent to be used is 200 parts by weight or less per 100 parts by weight of the monomer mixture.

The monomer mixture can also contain, as required, a thermal polymerization initiator. The thermal polymerization initiator that can be used in this case is not especially limited, but can be an azonitrile-based initiator, a peroxide-based initiator, etc. Examples of the azonitrile-based initiator include 2,2'-azobisisobutyronitrile, 2,2'-azobis(2-methylbutyronitrile) and 2,2'-azobis(2,4-dimethylvaleronitrile), and examples of the peroxide-based initiator include hydrogen peroxide, di-t-butyl peroxide and benzoyl peroxide. When a thermal polymerization initiator is added to the monomer mixture, its addition amount is preferably 0.001 to 5 parts by weight per 100 parts by weight of the monomer mixture.

The polymerization temperature is usually 150 to 350° C., preferably 180 to 320° C., and more preferably 200 to 300° C. If the temperature is lower than 150° C., there arises such a problem that molecular weight of the obtained polymer is too high, or reaction rate is lowered. On the other hand, if it is higher than 350° C., it should be noted that decomposition reaction may occur, thereby causing the reaction solution to be colored.

When the polymerization is carried out in the above-mentioned temperature range, the addition amount of the polymerization initiator can be reduced, and a polymer with a controlled molecular weight can be obtained without use of any chain transfer agent or with use of a small amount of a chain transfer agent, so that the polymer is made excellent in weather resistance. Controlling the molecular weight of the polymer is important for controlling the viscosity of the composition and for controlling the physical properties of the film formed by the composition. In case the composition is blended with another component, this is also an important factor for keeping the polymer well compatible with such a blended component.

Since the polymer of this invention can be obtained by means of continuous polymerization, it becomes uniform in molecular weight and chemical composition, and is improved in viscosity of the composition and in the balance of physical properties of the film obtained from the composition. The polymer is preferably produced by means of radical polymerization because it is good in productivity and raw materials therefor are readily available for diverse designs.

The pressure in the reactor vessel does not affect the reaction and depends on the reaction temperature and the boiling points of the monomer mixture and solvent in use. Thus, the pressure only has to be one that maintains the above-mentioned reaction temperature. Pressurization may be carried out by use of an inert gas such as nitrogen, as required.

Residence time of the monomer mixture is preferably 2 to 60 minutes. If the residence time is shorter than 2 minutes, a larger amount of monomers may remain unreacted to lower the yield of the polymer, and on the other hand, if the residence time is longer than 60 minutes, productivity may decline.

The polymer of this invention is highly polar at imide group portions thereof, and thus can well adhere to various molded articles of synthetic resins (plastics) as well as paper and wood, and furthermore can form films with excellent wear resistance. Especially in case where the imide group is a maleimide group, the ethylenically unsaturated bonds remaining in the polymer effect a dimerization reaction triggered by ultraviolet light, thereby causing crosslinking and thus providing the film with more excellent weather resistance. This effect is remarkable in the polymer obtained by polymerization of a maleimide monomer represented by the structural formula shown in said formula (2). The irradiation with ultraviolet light to cause the dimerization reaction may be intentionally carried out by use of an ultraviolet irradiation device after a film is formed, or the environmental ultraviolet light may be allowed to play the same role.

The composition of this invention does not have to contain a solvent, but may be dissolved or dispersed in a medium such as an organic solvent or water. As the organic solvent, those exemplified above can be used.

The composition of this invention can also contain a compound having a radical-polymerizable group (hereinafter called "radical-polymerizable compound"). The composition containing a radical-polymerizable compound is preferred since the resultant film can be cured by means of irradiation with an active energy beam such as ultraviolet light or electron beam, and improved in strength, wear resistance, water resistance, solvent resistance, etc.

The radical-polymerizable compound is not especially limited, but examples of the radical-polymerizable compound include urethane (meth)acrylates, polyester (meth) acrylates, epoxy (meth)acrylates and other (meth)acrylates.

The urethane (meth)acrylate includes, for example, a reaction product obtained by allowing a hydroxyl group-containing (meth)acrylate to react with a reaction product between a polyol and an organic polyisocyanate. The polyol includes a low molecular weight polyol, polyether polyol, polyester polyol, and the like. Examples of the low molecular weight polyol include ethylene glycol, propylene glycol, cyclohexanedimethanol, 3-methyl-1,5-pentanediol, and the like. Examples of the polyether polyol include polyethylene glycol, polyproylene glycol, and the like. Examples of the polyester polyol include reaction products between the low molecular weight polyol and/or the polyether polyol and an acid component selected from dibasic acids such as adipic acid, succinic acid, phthalic acid, hexahydrophthalic acid and telephthalic acid and anhydrides thereof. Examples of the organic polyisocyanate include tolylene dilsocyanate, 4,4'-diphenylmethane diisocyanate, 4,4'-dicyclohexylmethane diisocyanate, hexamethylene diisocyanate, isophorone diisocyanate, and the like. Examples of the hydroxyl group-containing (meth)acrylate include hydroxyalkyl (meth)acrylates such as 2-hydroxyethyl (meth)acrylate and 2-hydroxypropyl (meth) acrylate, and are preferably those which do not contain any aromatic component in view of weather resistance and curability.

The polyester (meth)acrylate includes, for example, a dehydration condensation product between a polyester polyol and (meth)acrylic acid. Examples of the polyester polyol include reaction products between a polyol selected, for example, from low molecular weight polyols such as ethylene glycol, polyethylene glycol, cyclohexanedimethanol, 3-methyl-1,5-pentanediol, propylene glycol, polypropylene glycol, 1,6-hexanediol and trimethylolpropane, and their alkylene oxide addition products, and an acid component selected from dibasic acids such as adipic acid, succinic acid, phthalic acid, hexahydrophthalic acid and terephthalic acid and anhydrides thereof. They are preferably those which do not contain any aromatic component in view of weather resistance and curability.

The epoxy acrylate is an addition reaction product of an epoxy resin with an unsaturated carboxylic acid such as (meth)acrylic acid, and includes epoxy (meth)acrylates of bisphenol A epoxy resins, epoxy (meth)acrylates of phenol or cresol novolak epoxy resins, and (meth)acrylic acid addition reaction products of diglycidyl ethers of polyethers. They are preferably those which do not contain any aromatic component in view of weather resistance and curability.

Examples of other (meth)acrylates include hydroxyalkyl (meth)acrylates such as 2-hydroxyethyl (meth)acrylate and 2-hydroxypropyl (meth)acrylate, acrylates of alkylene oxide addition products of phenol including phenoxyethyl (meth) acrylate and their halogen-nucleus substitution products, mono or di(meth)acrylates of glycols including mono or di(meth)acrylates of ethylene glycol, mono(meth)acrylates of methoxyethylene glycol, mono or di(meth)acrylates of tetraethylene glycol and mono or di(meth)acrylates of tripropylene glycol, (meth)acrylic acid-esterified products of polyols and their alkylene oxides including trimethylolpropane tri(meth)acrylate, pentaerythritol tri(meth)acrylate, pentaerythritol tetra(meth)acrylate and dipentaerythritol hexaacrylate, and (meth)acrylates having a maleimide group or succinimide group. They are preferably those which do not contain any aromatic component in view of weather resistance and curability.

Among the above-mentioned radical-polymerizable compounds, a compound with two or more radical-polymerizable groups in the molecule is preferred since the composition provides a film excellent in strength and wear resistance.

When the composition of this invention contains a radical-polymerizable compound, it is preferably constituted by 5 to 95 parts by weight, more preferably 10 to 90 parts by weight of the polymer obtained by the continuous polymerization of a maleimide monomer or succinimide monomer at high temperature based on 100 parts by weight of the total of said polymer and the radical-polymerizable compound. The reasons are that if the amount is smaller than 5 parts by weight, adhesion and weather resistance may become poor, and if it is larger than 95 parts by weight, strength and abrasion resistance of the film may be impaired.

The composition of this invention may also contain a photopolymerization initiator. Examples of the photopolymerization initiator include benzoin and its alkyl ethers such as benzoin, benzoin methyl ether, benzoin ethyl ether and benzoin isopropyl ether, acetophenones such as acetophenone, 2,2-dimethoxy-2-phenylacetophenone, 2,2-diethoxy-2-phenylacetophenone, 1,1-dichloroacetophenone, 1-hydroxyacetophenone, 1-hydroxycyclohexyl phenyl ketone, and 2-methyl-1-[4-(methylthio)phenyl]-2-morpholino-propane-1-one, anthraquinones such as 2-methylanthraquinone, 2-ethylanthraquinone, 2-tertiary-butylanthraquinone, 1-chloroanthraquinone and 2-amylanthraquinone, thioxanthones such as 2,4-dimethylthioxanthone, 2,4-diethylthioxanthone, 2-chlorothioxanthone and 2,4-diisopropylthioxanthone, ketals such as acetophenone dimethyl ketal and benzyl dimethyl ketal, benzophenones such as benzophenone, and xanthones. The photopolymerization initiator can be used alone or in combination with a photopolymerization accelerator such as benzoic acid-based or amine-based ones.

When the photopolymerization initiator is used, it is added in an amount of preferably 0.01 to 10 parts by weight, more preferably 0.1 to 5 parts by weight based on the total amount of the polymer and the radical-polymerizable compound. The reasons are that if the addition amount is too small, little effect may be taken, and if the addition amount is too large, the composition may be deteriorated in weather resistance.

The composition of this invention can also contain weather resistance improving agents such as an ultraviolet light absorber, a light stabilizer and an antioxidant. The composition of this invention has sufficiently excellent weather resistance, even if it does not contain such weather resistance improving agents. However, the composition will be further improved in weather resistance if such weather resistance improving agents are added thereto.

The ultraviolet light absorber includes a benzotriazole compound, and examples thereof include 2-(5-methyl-2-hydroxyphenyl)benzotriazole and 2-(3,5-di-t-amyl-2-hydroxyphenyl)benzotriazole.

The light stabilizer includes a hindered amine compound and benzoate compound. Examples of the hindered amine compound include bis(1,2,2,6,6-pentamethyl-4-piperidinyl) sebacate and bis(1,2,2,6,6-pentamethyl-4-piperidinyl) 2-(3, 5-di-t-butyl-4-hydroxybenzyl)-2-n-butylmalonate.

Examples of the benzoate compound include 2,4-di-t-butylphenyl-3,5-di-t-butyl-4-hydroxybenzoate, etc.

The antioxidant includes a hindered phenol compound and the like, and examples thereof include such as triethylene glycol-bis[3-(3-t-butyl-5-methyl-4-hydroxyphenyl) propionate] and 1,6-hexanediol-bis[3,5-di-t-butyl-4-hydroxyphenyl propionate].

When the weather resistance improving agents are used, they are added in an amount of preferably 20 parts by weight or less, more preferably 10 parts by weight or less per 100 parts by weight of the total of the polymer and the radical-polymerizable compound. The reason is that if the addition amount is too large, the resultant film may become insufficient in strength and hardness.

Furthermore, the composition of this invention can also contain, as required, various additives, for example, a filler such as barium sulfate, silicon oxide, talc, clay and calcium carbonate, a coloring pigment such as Phthalocyanine Blue, Phthalocyanine Green, titanium oxide and carbon black, an adhesion imparting agent, and a leveling agent. They are added in an amount of preferably 100 parts by weight or less per 100 parts by weight of the total of the polymer and the radical-polymerizable compound. A polymerization inhibitor such as hydroquinone, hydroquinone monomethyl ether, phenothiazine and N-nitrosophenylhydroxylamine aluminum salt can also be added, and the addition amount thereof is preferably 10 ppm to 2 wt% of the composition.

The composition of this invention can be cured by means of irradiation with an-active energy beam such as ultraviolet light or electron beam when the polymer contains a maleimide group or the composition contains a radical-polymerizable compound. When it is cured by irradiation with an electron beam, no photopolymerization initiator is necessary to be added, but when it is cured by irradiation with ultraviolet light, it is preferred to use the photopolymerization initiator exemplified above. However, when the polymer contains a maleimide group, it is not necessary to use the photopolymerization initiator since the maleimide group per se acts as a photopolymerization initiator, and this is preferred since the resultant composition is likely to made excellent especially in weather resistance.

The cured product of such an active energy beam curable composition is excellent in strength and hardness, and thus can be especially suitably used as coating agents such as top coating agents for plastics, coating agents such as OPV, paints, printing inks, adhesives, fillers, molding materials, electronic materials such as resists or the like.

The OPV of this invention is composed of the above-mentioned composition. Examples of the substrate to be covered with the OPV of this invention include regular paper mainly composed of cellulose, and also films and sheets of polyethylene, polyvinyl chloride, polypropylene, polyester, polycarbonate and polyimide, paper treated with any of these materials, and these substrates printed on their surfaces with various inks.

Methods for coating the substrate with the OPV of this invention include publicly known conventional methods such as direct coating and printing. For directly coating the substrate with OPV, such methods as curtain flow coating and roll coating can be used. Since the OPV of this invention can be made low in viscosity, direct coating such as spray coating can also be employed. When printing is used for coating, ordinary printing processes such as offset process, gravure offset process, gravure process and flexo process can be used. In this case, thickness of the coating film is usually such that the thickness of the finished film becomes preferably 1 to 20 $\mu$m, more preferably 1 to 5 $\mu$m. When the OPV contains an organic solvent, water or the like, such volatile components should be removed after coating. When the OPV is curable, the composition can be subsequently cured by irradiation with an active energy beam.

The paint of this invention is composed of the above-mentioned composition to which an inorganic or organic pigment or a dye is added, as required. Examples of the pigment include white pigments such as titanium oxide, zinc dust, white lead, lithopone and antimony oxide, black pigments such as aniline black, black iron oxide and carbon black, yellow pigments such as chrome yellow, yellow iron oxide, titan yellow, Hansa yellow (10G, 5G, 3G, etc.), benzidine yellow and Permanent Yellow, orange pigments such as chrome vermilion, Permanent Orange, Vulcan Fast Orange and Indanthrene Brilliant Orange, brown pigments such as iron oxide, Permanent Brown and Para Brown, red pigments such as red iron oxide, cadmium red, antimony vermilion, Permanent Red, Rhodamine Lake, Alizarine Lake, Thioindigo red, PV Carmine, Monolite Fast Red and quinacridone red pigment, violet pigments such as cobalt violet, manganese violet, Fast Violet, Methyl Violet Lake, Indanthrene Brilliant Violet and dioxazine violet, blue pigments such as ultramarine blue, Prussian blue, cobalt blue, Alkali Blue Lake, Peacock Blue Lake, Victoria Blue Lake, metal-free phthalocyanine blue, copper phthalocyanine blue, indanthrene blue and indigo, green pigments such as chrome green, chrome oxide green, emerald green, naphthol green, Green Gold, Acid Green Lake, Malachite Green Lake, phthalocyanine green and polychlorbrom-copper phthalocyanine, and also various fluorescent pigments, metallic powder pigments and extender pigments. These pigments are added in an amount of preferably 1 to 50 parts by weight, more preferably 5 to 30 parts by weight per 100 parts by weight of the total of the polymer and the radical-polymerizable compound.

The substrate that can be suitably covered with the paint of this invention includes various plastics, metals, wood, synthetic wood and the like. The composition of this invention can be suitably used especially for wood and plastics.

Methods for printing such substrates with the coating composition include publicly known conventional methods, for example, ordinary coating methods such as spraying, brushing and roll coating based on offset, gravure offset, gravure or other processes.

THE BEST MODES FOR CARRYING OUT THE INVENTION

This invention is described below particularly in reference to examples and comparative examples. Hereinafter, "parts" and "%" respectively mean "parts by weight" and "wt%". Viscosity was measured using an E type viscometer.

PRODUCTION EXAMPLE 1

A pressurizable stirring vessel reactor with an electric heater and a capacity of 300 ml was almost filled with diethylene glycol monoethyl ether, was kept at a temperature of 250° C., and was pressurized with nitrogen gas so that the gauge pressure was kept at 2.45 to 2.65 MPa (25 to 27 kg/cm$^2$) by means of a pressure regulator.

Then, with the pressure of the reactor kept constant, a monomer mixture consisting of 30 parts of 3,4,5,6-tetrahydrophthalimide ethyl acrylate as a maleimide monomer, 50 parts of methyl methacrylate (MMA) and 20 parts of butyl acrylate (BA) as comonomers, and 0.1 part of tertiary butyl peroxide as a thermal polymerization initiator began to be continuously supplied from a raw material tank into the reactor at a constant feed rate (23 g/min, residence time of 14 minutes), and the reaction solution in an amount corresponding to the feed rate of the monomer mixture was continuously taken out of the outlet. Immediately after start of reaction, the reaction temperature declined once, and then rose due to polymerization heat, but the heater was controlled to keep the reaction temperature at 250 to 251° C.

The reaction solution taken out in a period between the first hour and the second hour after the start of feed of the monomer mixture was sampled. During this period, 1340 g of the monomer mixture was supplied, and 1330 g of the reaction solution was recovered.

The reaction solution was introduced into a thin film evaporator, and the volatile matters such as unreacted monomers were separated, to obtain 1200 g of a product (called polymer A-1). It was confirmed by means of gas chromatography, that the concentrate did not contain any unreacted monomer. By means of GPC, the number average molecular weight (hereinafter expressed as Mn) of 6,800 and the weight average molecular weight (hereinafter expressed as Mw) of 15,600 were determined whilst polydispersity index was 2.3. Table 1 shows the composition and the determined molecular weights of the polymer.

PRODUCTION EXAMPLES 2 AND 3

Reactions were carried out in the same manner as in Production Example 1, except that the monomers used and their amounts were changed, to obtain polymers A-2 and A-3. Table 1 shows the compositions and the determined molecular weights thereof.

PRODUCTION EXAMPLE 4

A four-neck flask with a reflux condenser, a thermometer, a dropping funnel, a nitrogen introducing glass tube and a stirrer was charged with 90 g of 3,4,5,6-tetrahydrophthalimide ethyl acrylate as a maleimide monomer, 150 g of methyl methacrylate (MMA) and 60 g of butyl acrylate (BA) as comonomers, 12 g of 2,2'-azobisisobutyronitrile as a thermal polymerization initiator, and 700 g of methyl ethyl ketone as a solvent, and while nitrogen gas was blown therein, polymerization reaction was carried out at 80° C. for 4 hours, to obtain a reaction solution.

Out of the reaction solution, 350 g of it was introduced into a thin film evaporator, and volatile matters such as unreacted monomers were separated, to obtain 80 g of a product (hereinafter called polymer E-1). It was confirmed by means of gas chromatography, that the concentrate did not contain any unreacted monomer. By means of GPC, the molecular weights Mn 8,500 and Mw 27,300 were determined whilst polydispersity index was 3.2.

EXAMPLES AND COMPARATIVE EXAMPLES

Polymers obtained in the production examples, radical-polymerizable compounds and additives were mixed and dissolved to prepare the compositions shown in Table 2.

TABLE 1

| Copolymer | Imide acrylate monomer[1] | MMA[2] | BA[3] | Number average molecular weight | Weight average molecular weight |
|---|---|---|---|---|---|
| A-1 | 30 | 50 | 20 | 6800 | 15600 |
| A-2 | 50 | 30 | 20 | 7900 | 19000 |
| A-3 |  | 50 | 50 | 6100 | 14900 |
| E-1 | 30 | 50 | 20 | 8500 | 27300 |

Notes:
[1] 3,4,5,6-tetrahydrophthalimide ethyl acrylate

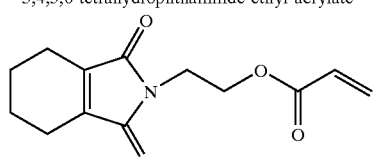

[2] Methyl methacrylate
[3] Butyl acrylate

TABLE 2

|  | A-1 | A-2 | A-3 | E-1 | M240 | M400 | Tinuvin 144[4] | Tinuvin 328[5] | Irg184[6] |
|---|---|---|---|---|---|---|---|---|---|
| Example 1 | 25 |  |  |  | 55 | 20 |  |  |  |
| Example 2 |  | 20 |  |  | 50 | 30 | 0.5 | 0.5 |  |
| Comparative Example 1 |  |  | 25 |  | 55 | 20 |  |  | 1.5 |
| Comparative Example 2 |  |  |  | 20 | 50 | 30 | 0.5 | 0.5 |  |

Notes:
[4] Tinuvin 144: TINUVIN 144 produced by Ciba Specialty Chemicals [bis(1,2,2,6,6-pentamethyl)-4-piperidyl 2-(3,5-di-t-butyl-4-hydroxybenzyl)-2-n-butylmalonate] (light stabilizer)
[5] Tinuvin 328: TINUVIN 328 produced by Ciba Specialty Chemicals [2-(3,5-di-t-amyl-2-hydroxyphenyl)benzotriazole] (ultraviolet light absorber)
[6] Irg 184: Irgacure 184 produced by Ciba Specialty Chemicals [Hydroxycyclohexylacetophenone] (photopolymerization initiator)

(Evaluation on Plastic Clear Paints)

The compositions prepared in Examples 1 and 2 and Comparative Examples 1 and 2 were evaluated according to the following methods. The results are shown in Table 3.

(1) Curability

A polycarbonate sheet (produced by Nippon Test Panel K.K.) was coated with a composition using a bar coater #10. The coated sheet was passed under an ultraviolet lamp repeatedly under the following conditions.
Ultraviolet Irradiation Conditions;
Lamp: 160 W/cm condensing high-pressure mercury lamp
Lamp height: 10 cm
Conveyor speed: 5 m/min The number of passing until the surface of the coating film lost tackiness was referred to for evaluation of curability according to the following three-level criterion. The result of evaluation is shown in Table 3. The energy given to the coating film under the above-mentioned irradiation conditions was about 90 mJ/cm$^2$ per pass.

○: Two or less times of passing.

Δ: Three to five times of passing.

X: Tacky on the surface even after five times of passing.

(2) Weather Resistance

A white polyvinyl chloride sheet produced by Nippon Test Panel K.K. as a substrate was coated to have a coating film thickness of 10 μm, and the coated sheet was passed under a 120 W/cm condensing high-pressure mercury lamp (one lamp, height 10 cm) at a conveyor speed of 5 m/min till the coating film became so cured that the surface became non-tacky when touched with hand.

For evaluating weather resistance, an accelerated exposure tester, Dewpanel Light Control Weather Meter DPWL-5R produced by Suga Test Instruments Co., Ltd. was used, and 6-hour moistening (100% RH/40° C.) and 6-hour irradiation (30 W/m$^2$/40° C.) were repeated alternately for 500 hours. Then, change in appearance was visually evaluated, and discoloration was evaluated by use of a color difference meter. The color difference meter used was Sigma 80 produced by Nihon Denshoku Industries Co., Ltd. The result of evaluation is shown in Table 3.

Appearance

○: No cracks were formed.

Δ: Some cracks were formed.

X: Cracks were formed throughout the coating film.

(3) Abrasion Resistance

A polycarbonate sheet produced by Nippon Test Panel K.K. as a substrate was coated to have a coating film thickness of 10 μm, and the coated sheet was passed under a 120 W/cm condensing high-pressure mercury lamp (one lamp, height 10 cm) at a conveyor speed of 5 m/min till the coating film became so cured that the surface became non-tacky when touched with hand.

Steel wool of #000 attached to the tip of a cylinder with a diameter of 25 mm was kept in contact with a horizontally placed sample surface and rotated five times (20 rpm) at a load of 1.0 kg. Then, scratches were visually observed. The result of evaluation is shown in Table 3.

⊚: Sample surface was not scratched.

○: Sample surface was slightly scratched.

Δ: Sample surface was greatly scratched.

X: The substrate surface was exposed in scratched portions.

(4) Adhesion

The coated sheet cured under the conditions of (2) was used for testing according to the method of JIS K 5400. The number of squares remaining out of 100 squares after removal of a cellophane adhesive tape was referred to for evaluation according to the following criterion.

A polycarbonate sheet produced by Nippon Test Panel K.K. was used as the substrate. The result of evaluation is shown in Table 3.

○: 90 or more

Δ: 10 to 90

X: 10 or less (5) Hardness

The coated sheet cured under the conditions of (2) was tested according to the method of JIS K 5400 to measure the pencil hardness. The result of evaluation is shown in Table 3.

TABLE 3

|  | Curability | Weather resistance Visual inspection | Color difference | Abrasion resistance | Adhesion | Hardness |
|---|---|---|---|---|---|---|
| Example 1 | ○ | ○ | 1.5 | ⊚ | ○ | 3H |
| Example 2 | ○ | ○ | 0.5 | ⊚ | ○ | 2H |
| Comparative Example 1 | Δ | X | 4.9 | ○ | X | H |
| Comparative Example 2 | ○ | Δ | 3.6 | Δ | ○ | F |

(Evaluation for OPV)

The compositions prepared in Examples 1 and 2 and Comparative Examples 1 and 2 were evaluated according to the following methods, and the results are shown in Table 4.

(6) Curability

A piece of coated paper was coated with an obtained composition using a bar coater #10, and the coated article was passed under an ultraviolet lamp repeatedly under the following conditions.
Ultraviolet Irradiation Conditions;
Lamp: 160 W/cm condensing high-pressure mercury lamp
Lamp height: 10 cm
Conveyor speed: 5 m/min The number of passing until the surface of the coating film lost tackiness was referred to for evaluation of curability according to the following three-level criterion. The energy given to the coating film under the above-mentioned irradiation conditions was about 90 mJ/cm$^2$ per pass.

○: Two or less times of passing.

Δ: Three to five times of passing.

X: Tacky on the surface even after five times of passing.

(7) Adhesion

The cured film obtained under the conditions of (6) was crosscut using a cutter knife, and a commercially available cellophane adhesive tape (produced by Nichiban Co., Ltd.) was contact-bonded to the surface and peeled. The condition of the cured film was visually evaluated according to the following three-level criterion.

○: The film was not peeled.

Δ: The film was peeled partially on the surface to which the tape had been bonded.

X: The film was peeled entirely on the surface to which the tape had been bonded.

(8) Gloss

The cured film obtained under the conditions of (6) was tested using a glossmeter (produced by Nippon Denshoku Industries Co., Ltd.), to measure the 60-degree gloss.

(9) Water Resistance

The surface of the cured film obtained under the conditions of (6) was visually observed and evaluated according to the following three-level criterion.

○: Nothing abnormal

Δ: Slight peeling and/or whitening occurred.

X: Apparent peeling and/or whitening occurred.

(10) Solvent Resistance

The cured film obtained under the conditions of (6) was rubbed on the surface with a swab impregnated with acetone, which was reciprocated every second with a load of 500 g, till the surface of the cured film became abnormal due to whitening, peeling or the like. The number of reciprocations was referred to for evaluation according to the following three-level criterion.

○: The cured film did not show anything abnormal even after 20 reciprocations.

Δ: The cured film became abnormal after 10 to less than 20 reciprocations.

X : The cured film became abnormal after less than 10 reciprocations.

TABLE 4

|  | Curability | Adhesion | Gloss | Water resistance | Solvent resistance |
|---|---|---|---|---|---|
| Example 1 | ○ | ○ | 91 | ○ | ○ |
| Example 2 | ○ | ○ | 89 | ○ | ○ |
| Comparative Example 1 | Δ | X | 89 | X | ○ |
| Comparative Example 2 | ○ | Δ | 86 | Δ | ○ |

Example 2, in which the polymer E-1 that was not produced according to high temperature continuous polymerization was employed as an ingredient, was found to be inferior in weather resistance and the like, compared with the polymer A-1 or A-2 that was produced according to high temperature continuous polymerization.

Industrial Applicability

The compositions of this invention are film-formable materials excellent especially in weather resistance, and are useful as paints, printing inks, adhesives, fillers, molding materials, resists and the like in various industrial fields. Especially, the compositions containing, as an active ingredient, a polymer obtained by the continuous polymerization of a maleimide monomer at high temperature are suitable for overprint varnishes (OPV) and paints since they are excellent further in solvent resistance, adhesion, water resistance, etc.

What is claimed is:

1. A composition which comprises, as an effective ingredient, a polymer obtained by effecting a continuous polymerization of a polymeriable monomer having a maleimide group and a polymerizable group other than the maleimide group, or a polymerizable monomer having a succinimide group, at a temperature of 150 to 350° C., in which the two carbons atoms constituting the double bond of said maleimide group are both substituted.

2. A composition according to claim 1, in which the polymerizable monomer has a maleimide group bonded to an acryloyl group by way of an oxyalkylene group.

3. A composition according to any one of claim 1 or 2, which further comprises, as an essential ingredient, a compound having a radical-polymerizable group.

4. An overprint varnish which comprises the composition according to any one of claims 1, 2 and 3.

5. A paint which comprises the composition according to any one of claims 1, 2 and 3.

6. A composition according to claim 1, in which said polymer is one obtained by effecting the continuous polymerization at a temperature of 180 to 320° C.

7. A composition according to claim 1, in which said polymer is one obtained by effecting the continuous polymerization at a temperature of 200 to 300° C.

8. A composition according to claim 1, in which said polymerization monomer having a maleimide group and a polymerizable group other than the maleimide group is a monomer represented by the following formula (2):

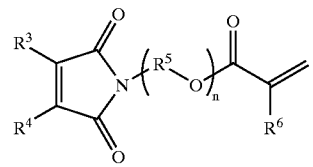

wherein $R^3$ and $R^4$ each independently denote an alkyl group with 1 to 4 carbon atoms, or jointly denote an alkylene group forming a five- or six-membered ring; $R^5$ denotes a straight-chain or branched-chain alkylene group with 1 to 6 carbon atoms; and $R^6$ denotes a hydrogen atom or methyl group; and n denotes an integer of 1 to 6.

9. A composition according to claim 1, in which said polymerizable monomer having a maleimide group and a polymerizable group other than the maleimide group is a monomer represented by the following formula (3) or (4):

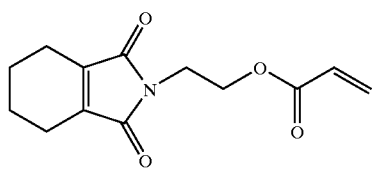

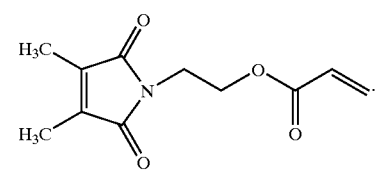

* * * * *

UNITED STATES PATENT AND TRADEMARK OFFICE
CERTIFICATE OF CORRECTION

| | |
|---|---|
| PATENT NO. | : 6,730,763 B1 |
| DATED | : May 4, 2004 |
| INVENTOR(S) | : Okazaki et al. |

It is certified that error appears in the above-identified patent and that said Letters Patent is hereby corrected as shown below:

<u>Title page</u>,
Item [87], PCT Filed, delete "Mar. 29, 2000" and insert -- Mar. 12, 2001 --.

Signed and Sealed this

Twenty-first Day of September, 2004

JON W. DUDAS
*Director of the United States Patent and Trademark Office*